United States Patent
Rychen

(10) Patent No.: US 8,950,010 B2
(45) Date of Patent: Feb. 3, 2015

(54) METHOD FOR MEASURING A PIEZOELECTRIC RESPONSE BY MEANS OF A SCANNING PROBE MICROSCOPE

(75) Inventor: Jörg Rychen, Zürich (CH)

(73) Assignee: Specs Zürich GmbH, Zurich (CH)

( * ) Notice: Subject to any disclaimer, the term of this patent is extended or adjusted under 35 U.S.C. 154(b) by 854 days.

(21) Appl. No.: 13/060,858

(22) PCT Filed: Aug. 27, 2008

(86) PCT No.: PCT/CH2008/000359
§ 371 (c)(1),
(2), (4) Date: Jul. 18, 2011

(87) PCT Pub. No.: WO2010/022521
PCT Pub. Date: Mar. 4, 2010

(65) Prior Publication Data
US 2011/0271412 A1    Nov. 3, 2011

(51) Int. Cl.
*G01Q 10/00* (2010.01)
*G01Q 60/32* (2010.01)
*B82Y 35/00* (2011.01)
*G01Q 10/06* (2010.01)

(52) U.S. Cl.
CPC ............... *G01Q 60/32* (2013.01); *B82Y 35/00* (2013.01); *G01Q 10/065* (2013.01)
USPC .................................... 850/1; 850/21; 850/62

(58) Field of Classification Search
USPC .................................. 850/1, 21, 62
See application file for complete search history.

(56) References Cited

U.S. PATENT DOCUMENTS

| 6,005,246 A | 12/1999 | Kitamura et al. |
| 2009/0013770 A1* | 1/2009 | Proksch et al. ............ 73/105 |

(Continued)

FOREIGN PATENT DOCUMENTS

| JP | 06258072 A | 9/1994 |
| JP | 06308180 | 11/1994 |

(Continued)

OTHER PUBLICATIONS

International Search Report in corresponding PCT application Nr. PCT/CH2008/000359 mailed Jun. 2, 2009.

(Continued)

*Primary Examiner* — Michael Maskell
(74) *Attorney, Agent, or Firm* — Marshall, Gerstein & Borun LLP

(57) ABSTRACT

The piezoelectric response of a sample (3) is measured by applying a scanning probe microscope, whose probe (2) is in contact with the sample (3). The probe is mounted to a cantilever (1) and an actuator (5) is driven by a feedback loop (7, 11, 12, 4) to oscillate at a resonance frequency f. An AC voltage with principally the same frequency f but with a phase (with respect to the oscillation) and/or amplitude varying periodically with a frequency fmod is applied to the probe for generating a piezoelectric response of the sample (3). A lock-in detector (20) measures the spectral components at the frequency fmod of the control signals (K, f) of the feedback loop. These components describe the piezoelectric response and can be recorded as output signals of the device. The method allows a reliable operation of the detector oscillator resonator (1) at its resonance frequency and provides a high sensitivity.

5 Claims, 6 Drawing Sheets

(56) References Cited

U.S. PATENT DOCUMENTS

| | | | | |
|---|---|---|---|---|
| 2009/0307809 A1* | 12/2009 | Ziegler et al. | | 850/62 |
| 2010/0031404 A1* | 2/2010 | Rychen | | 850/33 |
| 2011/0154546 A1* | 6/2011 | Proksch et al. | | 850/1 |
| 2012/0079631 A1* | 3/2012 | Proksch et al. | | 850/1 |
| 2013/0117895 A1* | 5/2013 | Proksch et al. | | 850/1 |

FOREIGN PATENT DOCUMENTS

| | | | | |
|---|---|---|---|---|
| JP | 2005241525 A | | 9/2005 | |
| JP | 2007155423 A | | 6/2007 | |
| WO | WO-2008/006229 | | 1/2008 | |
| WO | WO 2008006229 A1 * | | 1/2008 | G01Q 10/06 |
| WO | WO-2008/071013 | | 6/2008 | |
| WO | WO 2008071013 A1 * | | 6/2008 | G01Q 60/30 |

OTHER PUBLICATIONS

International Preliminary Report on Patentability in corresponding PCT application Nr PCT/CH2008/000359 mailed Mar. 1, 2011.
"Bimodal Dual AC™ Imaging," *Asylum Research App Note* 20, Aug. 2008.
"The Piezo Force Module for Electromechanical Measurements," *Asylum Research Data Sheet* 27, Aug. 2008.
Jesse et al., "The band excitation method in scanning probe microscopy for rapid mapping of energy dissipation on the nanoscale," *Nanotechnoloy* 18: 1-8, 2007.
Chen et al., "Structures and Local Polarized Domains of Ferroelectric Organic Films Studied by Atomic Force Microscopy," *Jpn. J. Appl. Phys.*, 37:3834-3837, 1998.
Dunn et al., "Substrate effects on domain structures of PXT 30/70 sol-gel films via PiezoAFM," *Journal of the European Ceramic Society* 22:825-833, 2002.
Fukuma et al., "Surface potential measurements by the dissipative force modulation method," *Review of Scientific Instruments* 75(11): 4589-4594, Nov. 2004.
Jacobs e al., "Practical aspects of Kelvin probe force microscopy," *Review of Scientific Instruments* 70(3): 1756-1760, Mar. 1999.
Kobayashi et al., "High-Sensitivity Force Detection by Phase-Modulation Atomic Force Microscopy," *Japanese Journal of Applied Physics* 45(30): L793-L795, 2006.
Wu et al., "AC driving amplitude dependent systematic error in scanning Kelvin probe microscope measurements: detection and correction," *Review of Scientific Instruments* 77: 045711-1-043711-9, 2006.
Takahashi et al., "Phase detection of electrostatic force by AFM with a conductive tip," *Ultramiscroscopy* 62: 63-68, 2000.
Andraka, R., "A survey of CORDIC algorithms for FPGA based computers," ACM Inc., Monterey, CA, US, 1998.
Nonnenmacher, et al., "Kelvin probe force microscopy," *Appl. Phys. Lett* 58(25): 2921-2923, Jun. 24, 1991.
Japanese Office Action corresponding to Japanese Application No. 2011-524153 dated Jan. 22, 2013.

* cited by examiner

METHOD FOR MEASURING A PIEZOELECTRIC RESPONSE BY MEANS OF A SCANNING PROBE MICROSCOPE

TECHNICAL FIELD

The invention relates to a method for measuring a piezoelectric response of a sample by means of a scanning probe microscope.

BACKGROUND ART

In Piezo Response Force Microscopy (PFM) thin films of piezoelectric materials are investigated by means of a scanning probe microscope. An AC voltage is applied between the probe and the sample in order to generate an alternating electric field in the sample in order to obtain the piezoelectric response.

The probing tip touches the surface with a controlled normal DC force. The oscillation of the tip due to the piezo mechanical response of the sample caused by the AC signal is detected with a lock-in amplifier and is a measure of the polarization of the piezo electric sample.

This type of measurement is e.g. widely used for characterizing thin ferroelectric storage media. In particular, it can be applied to obtain a spatially resolved image of the polarization direction and the domains of the sample.

In order to enhance the sensitivity, one would like to use the mechanical resonance of the cantilever. But the resonance frequency is changing when moving the tip along the surface. To stay on resonance, one would like to use a PLL or a self excitation loop. But this is not possible due to the phase changes by 180 degrees when moving from one polarization to a reversed polarization of the sample. When passing regions with no polarization, the oscillation cannot be maintained via excitation of the piezoelectric material. Several Solutions have been proposed for this problem:

Dual Frequency Resonance Tracking (DFRT): the resonance is excited at two frequencies, one slightly above and one slightly below the resonance frequency. The response amplitudes at these two frequencies, A1 and A2, as measured with two separate lock-ins. The difference A1−A2 is a measure of the drift of the resonance frequency. A feedback loop can readjust the resonance frequency and the two excitation frequencies. The disadvantage of this techniques is that the low-pass filters of the lock-ins have to be narrow such that the two frequencies do not disturb each other. For high Q resonances this results in very slow measurements.

Band excitation: Basically a complete frequency spectrum is recorded at each measurement point. This is done by generating a special excitation waveform which contains all frequencies within the band where the resonance frequency is supposed to be. The response is then processed with a Fourier transform, and the amplitude, resonance frequency, and the quality factor are determined. The disadvantage of this technique is that it requires high processing power and that it is quite slow since some time has to be spent on each measurement point.

WO 2008/071013 is in many aspects similar to the present invention. However, it is directed to the measurement of electrostatic interactions between sample and probe, and not the piezoelectric response of the probe. For reasons explained at the end of the description, this prior art uses similar technologies as the present invention, but applies them in a very different manner.

Other related prior art: Nanotechnology 18(2007) 435503 (8pp): The band excitation method in scanning probe microscopy for rapid mapping of energy dissipation on the nanoscale. Stephen Jesse, Sergei V Kalinin, Roger Proksch, A P Baddorf, and B J Rodriguez.

DISCLOSURE OF THE INVENTION

The general object of the present invention is to provide a method of this type with high sensitivity.

This object is achieved by the method of claim 1. Accordingly, the probe of the scanning probe microscope is mounted to a mechanical resonator which is excited into a resonant oscillation at a resonance frequency f by means of a mechanical actuator.

In more detail, the AC voltage generates the piezoelectric response of the sample, which exerts a first oscillating force to the resonator through the probe. The mechanical actuator, on the other hand, exerts a second oscillating force on the resonator, in addition to the first oscillating force. The second oscillating force has a frequency corresponding to one of the resonance frequencies of the resonator, such that the resonator is caused to perform a resonant oscillation.

The piezoelectric response of the material is derived from the influence of the applied AC voltage on the resonant oscillation.

Accordingly, the invention exploits the fact that the parameters of the resonant oscillation, such as frequency and amplitude, depend strongly on the disturbance of the system caused by the piezoelectric effect.

In a particularly advantageous embodiment, the scanning probe microscope is operated in "contact mode", i.e. it is in continuous mechanical contact with the sample. In this context, "continuous" is to be interpreted such that, at any time during an oscillation cycle of the resonator, the probe is in mechanical contact with the sample. When the probe is operated in "contact mode", it is most sensitive to the mechanical deformations caused by the piezoelectric response. In contrast to this, in "tapping mode", where the probe contacts the sample only during part of the oscillation cycle of the resonator, or in "non-contact mode", where the probe does not contact the sample at all and electrostatic effects are the primary forces of interaction, the sensitivity to the piezoelectric response is substantially weaker.

Other advantageous embodiments are described in the dependent claims as well as in the following description.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

The expression "measuring the piezoelectric response" of the sample is to be understood as measuring a parameter of the sample that affects or depends on the piezoelectric effect. In particular, the measured parameter can e.g. be the direction of polarization of the sample at the location of the probe, a strength of the piezoelectric effect of the probe, or the location of a domain boundary.

The term "mechanical contact" describes a contact where repulsive forces are the predominant forces of the interaction between the probe and the sample.

Embodiment 1

Figure 1:
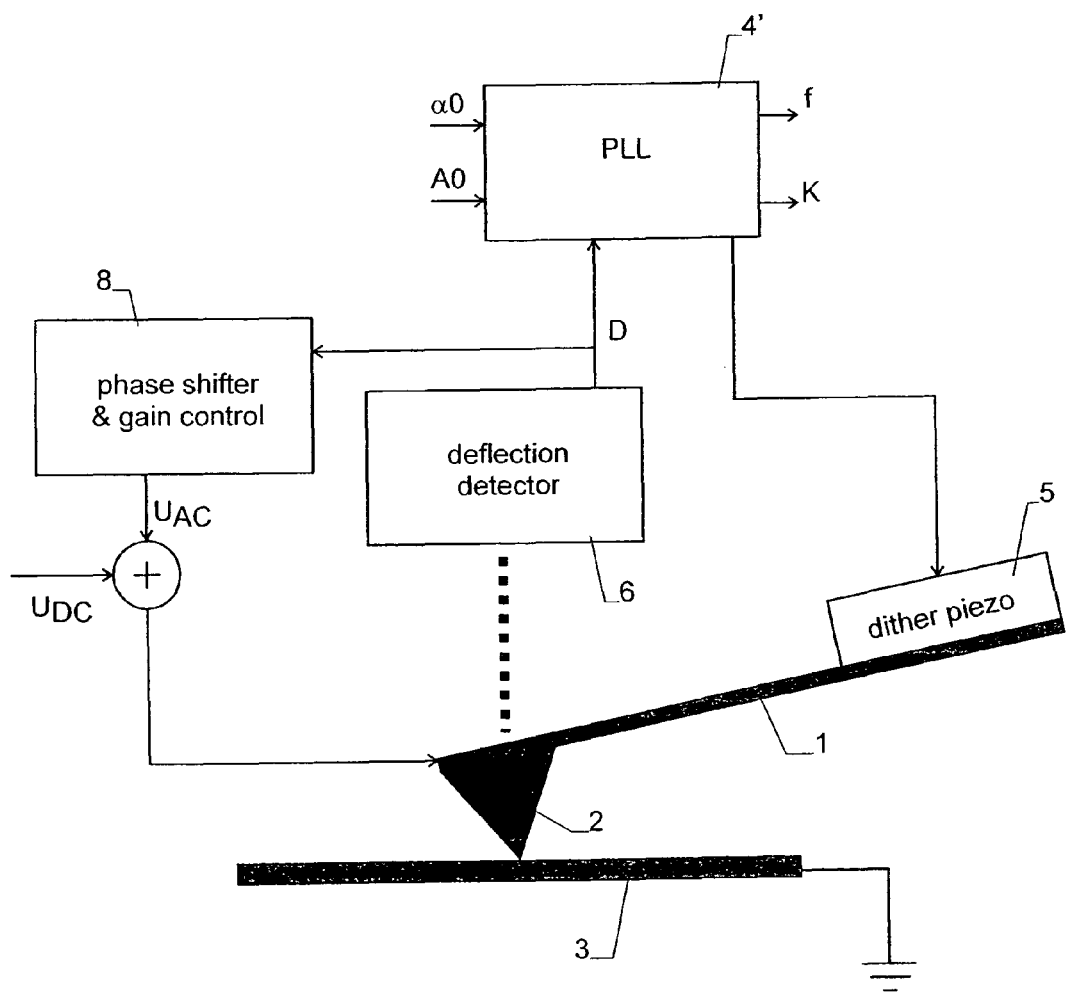
FIG. 1 is a first embodiment of a scanning probe microscope where $U_{AC}$ has the same frequency as the resonator resonance frequency.

FIG. 1 shows a scanning probe microscope having a flexible cantilever 1 and a probe 2 with a fine tip, which is moved along the surface of a sample 3. Cantilever 1 is the mechanical resonator of the microscope. The tip of probe 2 is advantageously in continuous mechanical contact with the sample 3.

The scanning probe microscope is provided with suitable means for adjusting the x-, y- and z-position of probe 2 in respect to sample 3. These means, which are not shown in any of the figures, can be implemented in various manner known to the person skilled in the art.

The components shown in the figures represent the parts of the microscope that allow to measure the piezoelectric response of sample 3 by applying a voltage between probe 2 and sample 3. They comprise a phase looked loop (PLL) controller 4' driving a dither piezo 5, which acts as an actuator applying a mechanical force to cantilever 1. (If cantilever 1 is itself of a piezoelectric material, no separate actuator is required. Rather, in this case, cantilever 1 forms the resonator as well as the actuator).

The oscillatory deflection of cantilever 1 is measured by a deflection detector 6 and fed back to PLL controller 4'. PLL controller 4' is set up to excite cantilever 1 at a resonance frequency f.

The raw signal D measured by deflection detector 6 is, in the embodiments shown here, assumed to be proportional to and in phase with the present deflection position of the cantilever. (If raw signal D is phase shifted in respect to this deflection, appropriate phase correction can be applied in the other parts of the signals as known to the person skilled in the art.) Raw signal D is fed to a phase shifter & gain control 8, where it is phase shifted by a given phase shift and amplified or attenuated to generate an AC voltage $U_{AC}$ with fixed amplitude. Phase shifter 8 is set to introduce a phase shift $\Delta\phi$ between the deflection (i.e. raw signal D) and voltage $U_{AC}$.

Optionally, a DC voltage $U_{DC}$ can be added to $U_{AC}$, and the resulting voltage is applied between probe 2 and sample 3, e.g. by applying the voltage to probe 2 and grounding sample 3, as shown, or vice versa.

In the absence of voltage $U_{AC}$, the system shown in FIG. 1 would operate the mechanical resonator of the microscope at its resonance frequency f. When $U_{AC}$ is applied, an additional mechanical force is applied to the tip of probe 2 due to the piezoelectric deformation of sample 3. The additional force has the same frequency as the current resonance frequency f of the resonator. Its effect depends on the phase shift $\Delta\phi$ between the force and the oscillation motion of the resonator.

Depending on phase shift $\Delta\phi$ the piezoelectrically generated force is in phase or out of phase with the oscillation of the probe and is therefore conservative or dissipative. Hence, the piezoelectric force may change the amplitude A of the oscillation, or it may introduce a phase shift and therefore change the resonance frequency f, and/or the excitation amplitude K.

The values of excitation amplitude K and/or frequency f are used as outputs of the device. The corresponding signals can e.g. be generated by PLL controller 6.

The operation of the device of FIG. 1 is as follows:

In first step, probe 2 is brought into mechanical contact with sample 3 by decreasing the distance along z until a deflection of cantilever 1 is observed. This procedure is known to the skilled person.

Now, a resonance of the cantilever 1 is determined by measuring its frequency response. Then PLL controller 4' is activated to track the resonance frequency and keep its oscillation amplitude constant. Then the surface of sample 3 is scanned by moving probe 2 along the x- and/or y-directions while monitoring the frequency f and/or excitation amplitude A. When the local piezoelectric response of the sample 3 changes, the values f and/or A will change.

In the device of FIG. 1 AC voltage $U_{AC}$ has a frequency equal to the resonance frequency f and a constant phase shift $\phi$ in respect to a motion of the cantilever, i.e. the resonator. A problem of this approach is that other tip-sample interactions can influence the values of A and f as well, such as differing contact stiffness or capillary forces. This problem is avoided by the embodiments of the invention described below, where the AC voltage has a time-varying amplitude and/or non-constant phase shift $\phi(t)$ in respect to a motion of the resonator.

Embodiment 2

Figure 2:
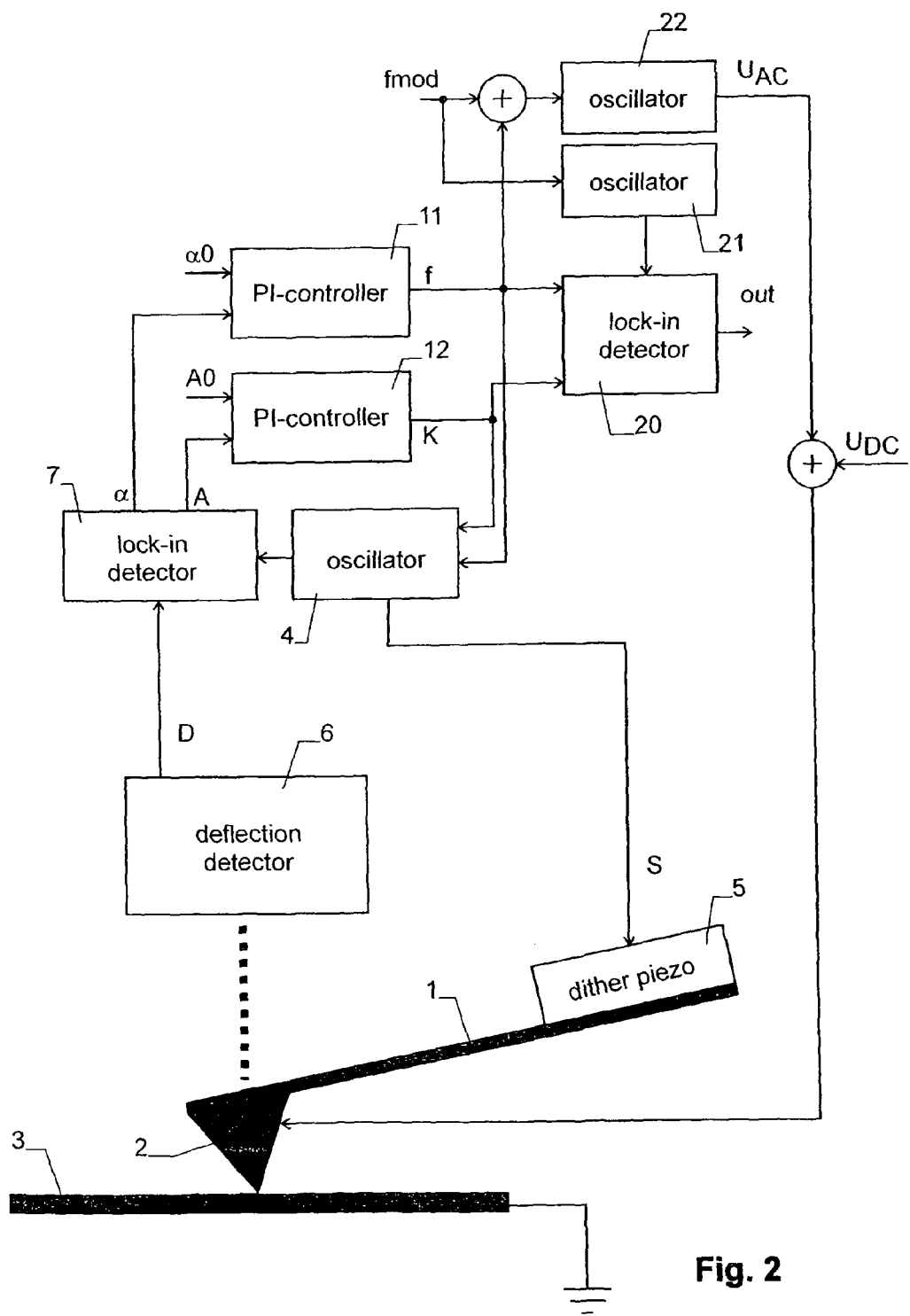
FIG. 2 is a second embodiment of the invention where $U_{AC}$ has a constant frequency offset in respect to the resonator resonance frequency.

The second embodiment as shown in FIG. 2 also excites cantilever 1 on its resonance frequency f, but $U_{AC}$ has a different frequency $f_{AC}$.

The mechanical resonator is again excited by means of a closed loop comprising a PI controller 11 generating a frequency signal f indicative of the current resonance frequency of the resonator, a PI controller 12 generating an amplitude signal K, and an oscillator generating a master signal S at frequency f with amplitude K. Master signal S drives dither piezo 5, which again acts as an actuator applying a mechanical force to cantilever 1. Since a PLL is used the frequency is chosen on the resonance.

The oscillatory deflection of cantilever 1 is measured by deflection detector 6 and a lock-in detector 7, with the latter generating signals indicative of the phase shift $\alpha$ of the deflection D in respect to master signal S and its amplitude A at frequency f.

PI-controller 11 compares the phase $\alpha$ from lock-in amplifier 7 with a phase setpoint $\alpha 0$ and controls the frequency f of oscillator 4 for keeping phase $\alpha$ equal to phase setpoint $\alpha 0$. For this purpose, the output signal f of PI-controller 11 is fed a frequency control input of oscillator 4.

PI-controller 12 compares the amplitude A from lock-in amplifier 7 with an amplitude setpoint A0 and controls the amplitude of master signal S for keeping amplitude A equal to amplitude setpoint A0. For this purpose, the output signal K of PI-controller 12 is fed an amplitude control input of oscillator 4.

The embodiment of FIG. 2 further comprises a control input carrying a signal indicative of a modulation frequency $f_{mod} \ll f$.

Modulation frequency $f_{mod}$ is added to resonance frequency f for generating the frequency $f_{AC}=f+f_{mod}$ by means of an oscillator 22. The output of oscillator 22, which oscillates at $f_{AC}$, is used to generate the AC voltage $V_{AC}$.

A further oscillator 21 is provided for generating a signal at modulation frequency $f_{mod}$ and feeding the same to a lock-in detector 20.

Lock-in detector 20 measures the output of PI-controller 11 (corresponding to the frequency f of the master signal) and the output of PI-Controller 12 (corresponding to the amplitude signal K).

Lock-in detector 20 measures the output signals of the two PI-controllers 11, 12 at the frequency $f_{mod}$ and in respect to the phase of the output of oscillator 21.

$f_{mod}$ is, as mentioned, typically much smaller than frequency f of the master signal ($f_{mod}$ is e.g. 0-5 kHz while f is e.g. 50 kHz-5 MHz).

The operation of the device of FIG. 1 is as follows:

In first step, suitable setpoints α0 and A0 for the PI-controllers 11 and 12 are determined by analyzing the frequency response of a cantilever resonance as in the first embodiment.

During a measurement, probe 2 is moved along sample 3 while measuring (advantageously recording) the output of lock-in detector 20, i.e. the variation of the resonance frequency f and/or the amplitude K at and in respect to frequency $f_{mod}$.

In more general terms, in this as well as the following embodiments, the resonant oscillation of cantilever 1 is maintained while moving probe 2 along sample 3, while, at the same time, at least one parameter required for maintaining the resonant oscillation is measured at the frequency $f_{mod}$. This parameter can e.g. be the amplitude K required for driving actuator 5, or it can be the resonance frequency f of oscillator 4.

Advantageously, the parameter is not only measured, by it is recorded, in order to generate a one or two dimensional image of the sample.

In order for this scheme to work efficiently, the primary control loop maintaining the resonant oscillation of the resonator or cantilever 1 should have a response time smaller than $1/f_{mod}$ such that the control signals that are used within the control loop for driving the excitation of the resonator, such as the values at the outputs of the PI-controllers 11, 12, vary at the frequency $f_{mod}$ and can directly be used as parameters to be measured.

Embodiment 2

Digital Implementation

Figure 3:
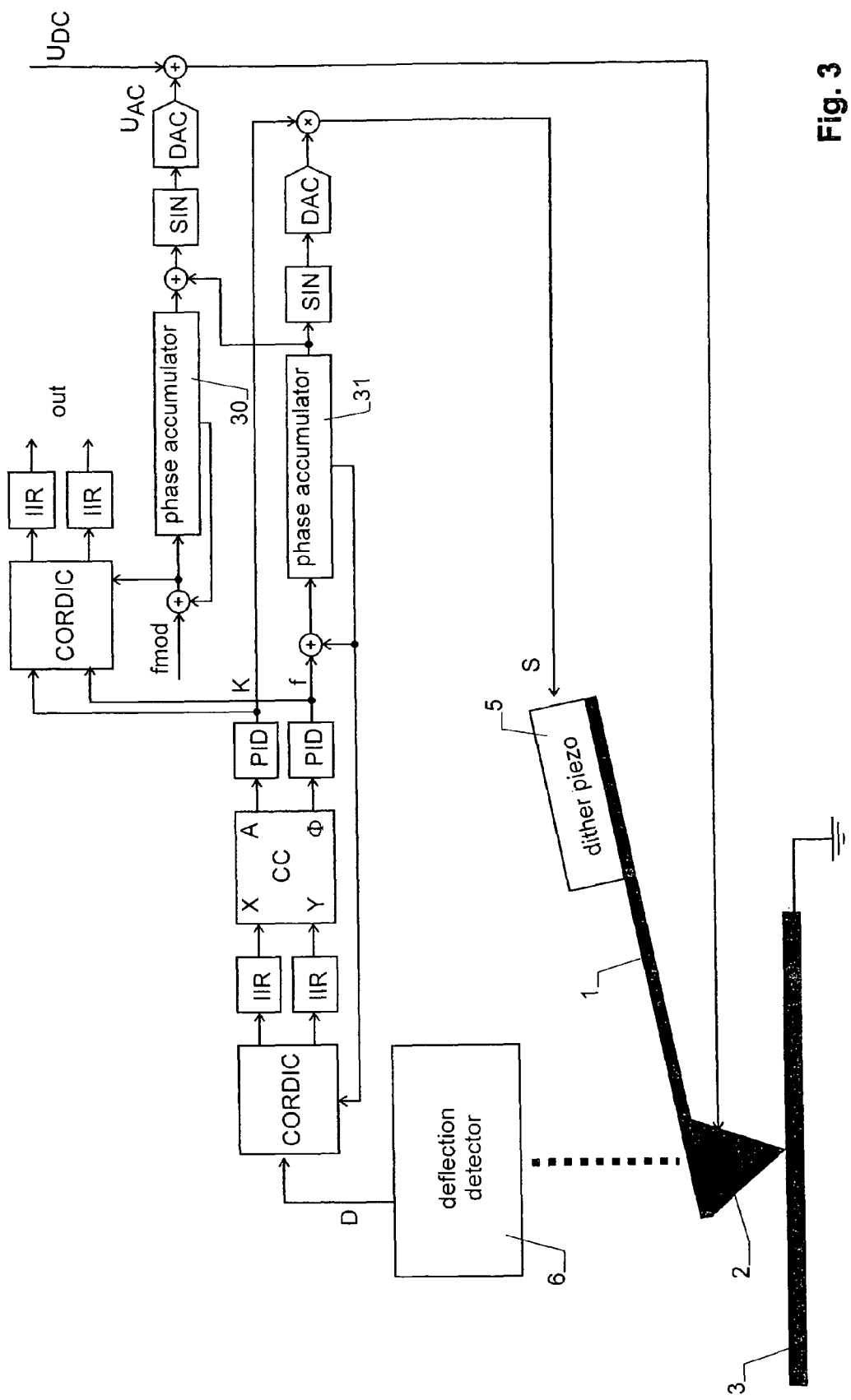
FIG. 3 is an FPGA implementation of the embodiment of FIG. 2.

FIG. 3 shows an implementation of the embodiment of FIG. 2 as a Field Programmable Gate Array (FPGA). In the figure, the following abbreviations are used:

CORDIC: Coordinate Rotation Digital Computer. Such a unit implements an algorithm that can be used for rotating a vector. It has two inputs (x, y) describing the input vector, an input phi indicating the angle of rotation, and two outputs describing the rotated vector.

CC: Coordinate Converter, a unit converting Cartesian coordinates into polar coordinates. This functionality can e.g. be implemented by means of a CORDIC.

PID: Proportional, Integral and Differential controller.

SIN: A lookup table for sine (or cosine) values for generating a sine (or cosine) waveform from a series of consecutive integer numbers.

DAC: digital analog converter.

The two phase accumulators are registers that are incremented by a given value in each cycle, the value representing the frequency. The accumulator wraps when it overflows. The value from each accumulator is fed to a SIN lookup table for generating the signals S and $U_{AC}$.

IIR: Infinite impulse response filter. A digital low-pass filter that is easy to implement.

As can be seen, the sine waves corresponding to the voltages applied over actuator 5 and the AC voltage $U_{AC}$ are generated by means of the two phase accumulators 30, 31. While the value of phase accumulator 30 increases slowly, the one of phase accumulator 31 increases quickly. The voltage over dither piezo 5 is generated by applying the sine function to the value of phase accumulator 31. $U_{AC}$ is generated by applying the sine function to the sum of the values of both phase accumulators 30, 31. This expresses the fact that the voltage $U_{AC}$ can be considered to have the frequency f but with a linearly increasing phase shift $\phi(t)=2\pi \cdot f_{mod} \cdot t$ in respect to the voltage over dither piezo 5. However, since a phase shift of $2\pi$ is equivalent to a phase shift of 0, $\phi(t)$ can also be considered as a being described by a periodic sawtooth-variation between 0 and $2\pi$ at a frequency $f_{mod}$.

Embodiment 3

Figure 4:
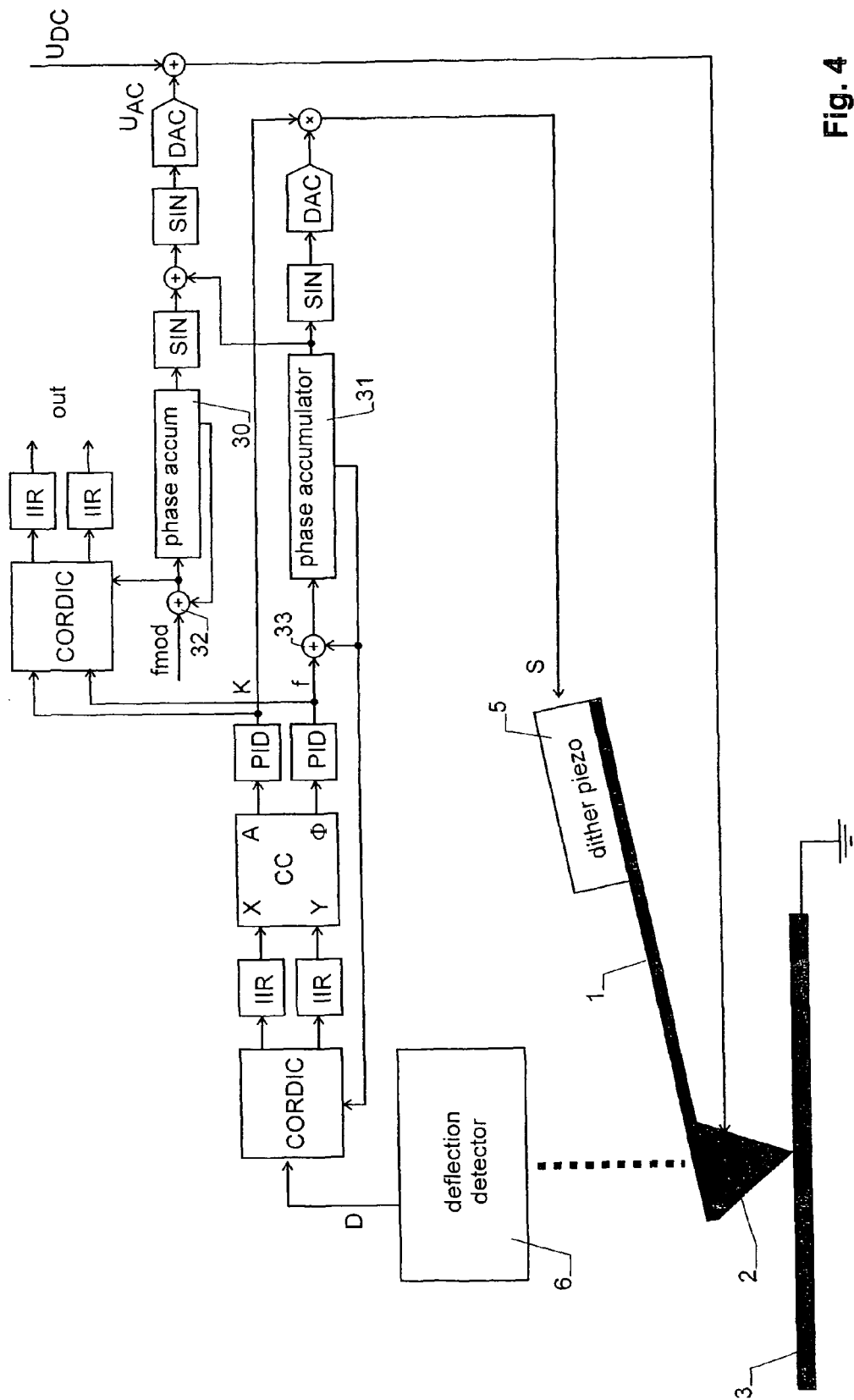
FIG. 4 is a third embodiment of the invention with sinusoidally varying phase shift between $U_{AC}$ and the mechanical oscillation of the resonator.

FIG. 4 shows the FPGA implementation of a third embodiment of the invention. It differs from the one of FIG. 3 in that the phase between $U_{AC}$ and the mechanical oscillation is not increased linearly over time, but the sine function is applied to the value of phase accumulator 30, which results in $U_{AC}$ having frequency f but a phase shift $\phi(t)=\sin(2\pi \cdot f_{mod} \cdot t)$.

Embodiment 4

The embodiment uses a self-excitory loop with a phase shifter and gain control 34 for operating the resonator (cantilever 1) at one of its resonance frequencies f. However, $U_{AC}$ is set to operate at a fixed frequency $f_{AC}$ close to but not equal to f by providing a separate oscillator 22. Advantageously, $f_{mod}=abs(f-f_{AC})<5$ kHz, as above.

The output signal for the measurement is generated by a lock-in detector 20, which measures the frequency f and/or the excitation amplitude K of the mechanical resonance at the frequency $f_{mod}=f-f_{AC}$. $f_{mod}$ is generated by multiplying the deflection signal D with the output of oscillator 22 in a multiplier circuit 37 and filtering the product in a band pass filter 38, as known to the skilled person.

Embodiment 5

Figure 5:
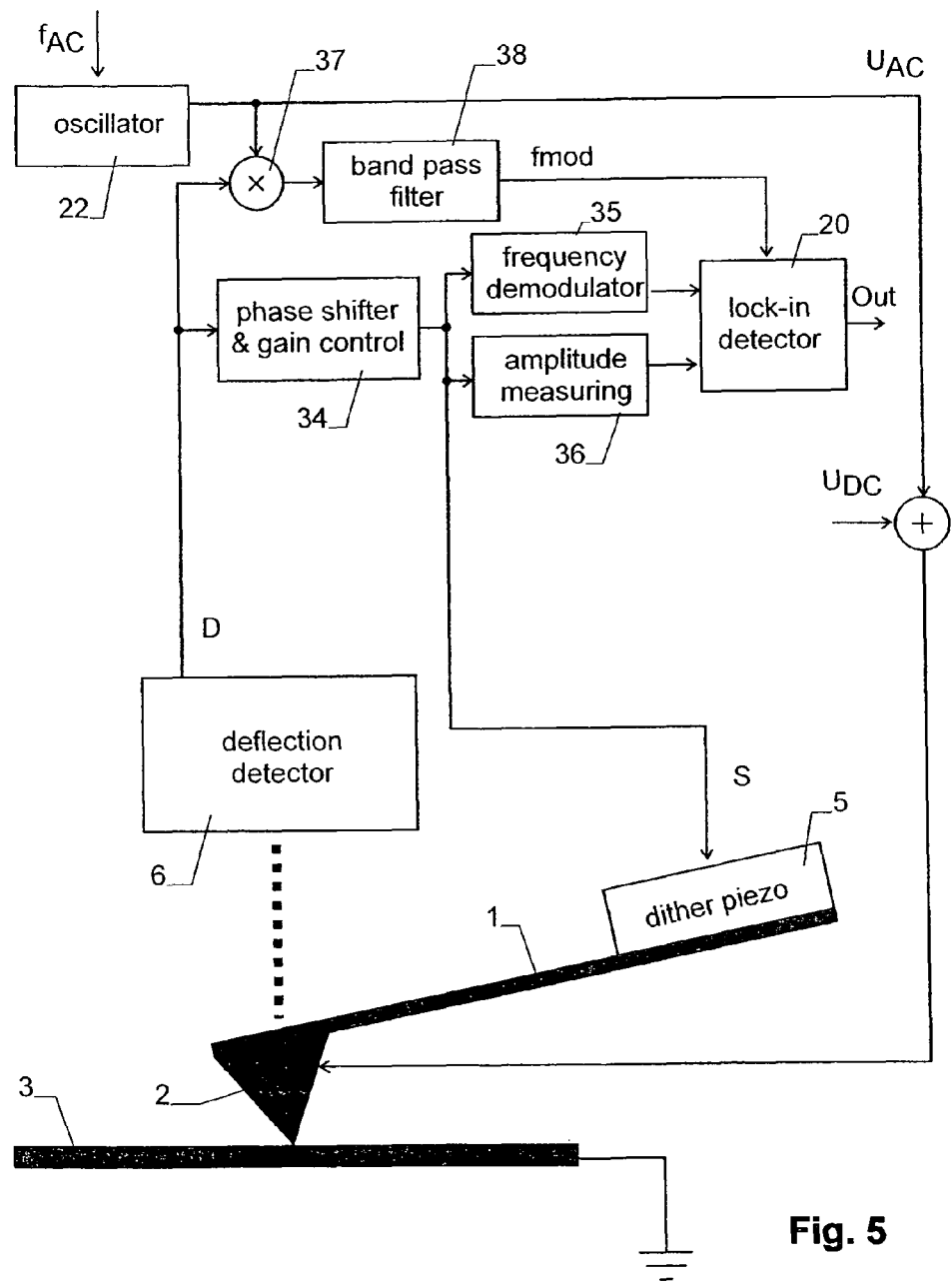
FIG. 5 is a fourth embodiment of the invention where $U_{AC}$ has fixed frequency.
Figure 6:
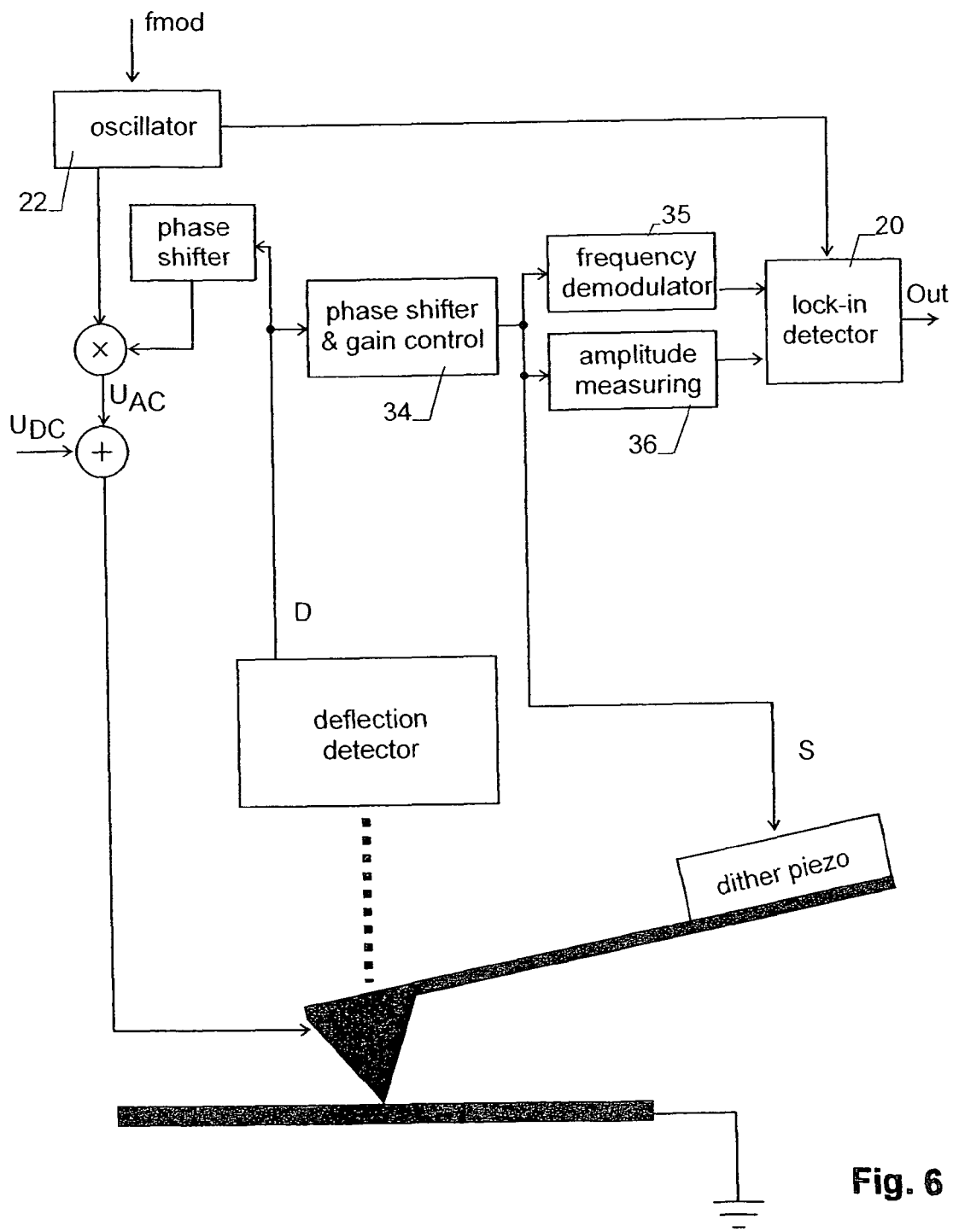
FIG. 6 is a fifth embodiment of the invention using amplitude modulation for $U_{AC}$.

The embodiment of FIG. 6 differs from the one of FIG. 5 in that the frequency $f_{AC}$ of the AC voltage $U_{AC}$ is equal to the resonance frequency f, as in the embodiment of FIG. 1, but $U_{AC}$ is amplitude modulated with frequency $f_{mod}$. For this purpose, oscillator 22 is operated at $f_{mod}$ and its output is multiplied with a phase shifted version of the output D of deflection detector 6.

Lock-in detector 20 is again operating at $f_{mod}$ for measuring the frequency f and/or the excitation amplitude K of the mechanical resonance.

Further remarks:

As mentioned, AC voltage $U_{AC}$ can be superimposed by a DC voltage $U_{DC}$. This DC voltage can e.g. be used to measure hysteresis effects or to move domain boundaries or to locally polarize the piezomaterial.

The present invention can be used for measuring piezoelectric displacements having components in directions perpendicular or parallel to the surface of sample 3:

For measuring a piezoelectric displacement of sample 3 parallel to its surface, the resonator should be designed such that probe 3 is oscillating at resonance frequency f in a direction that has a non-zero component parallel to the surface of the sample. For example, the resonance excited by the actuator (dither piezo 5) can correspond to a torsion of cantilever 1, which results in a pendulum motion of the tip of probe 2 over sample 3.

For measuring a piezoelectric displacement of sample 3 perpendicular to its surface, the resonator should be designed such that probe 3 is oscillating at resonance frequency f in a direction that has a non-zero component perpendicular to the surface of the sample. In this case, the resonance excited by the actuator (dither piezo) is e.g. a bending of cantilever 1, which causes probe 2 to carry out small periodic movements in vertical direction.

In the above embodiments, the AC voltage $U_{AC}$ was applied between probe 2 and sample 3. However, the AC voltage $U_{AC}$ can e.g. also be applied to electrodes mounted to the sample directly.

In all aspects of the present invention, the resonator is brought into resonant oscillation by means of an actuator. The actuator is a mechanical actuator in the sense that it applies a mechanical force to the resonator in addition to the mechanical force of the piezoelectric response. The actuator can e.g. be a dither piezo, magnetic actuator, a thermal actuator or an electrostatic actuator.

The measurement is based on the combination of a direct mechanical excitation of the actuator and an excitation through the piezoelectric response of sample 3.

The piezoelectric response of sample 3 is derived from the influence of the applied AC voltage on the resonant oscillation of the resonator:

In the embodiment 1, $U_{AC}$ has the same frequency as the mechanical resonator, and its amplitude and phase shift are fixed. The influence of the applied AC voltage on the resonant oscillation lies in the fact that the frequency f and/or the driving amplitude K or amplitude A of the resonant oscillation changes, which can e.g. be measured directly by observing the control parameters of the phase locked loop.

In the other embodiments, there is either a periodic, time-varying phase shift $\phi(t)$ between $U_{AC}$ and the mechanical resonator, or the amplitude of Um is varied periodically. (Note that these two variations in amplitude and phase shift can also be combined.) The periodicity of the variation is $f_{mod}$, and a spectral analysis at $f_{mod}$ of the control signals within the closed loop that excites the resonator at its resonance frequency allows to identify the effects of the piezoelectric response.

It must be noted that the embodiments of the present invention use technologies that are, in a sense, similar to those described in WO 2008/071013 by the same applicants. In WO 2008/071013 an AC voltage was applied to the probe in order to generate electrostatic interaction between probe and sample. In addition to this, a DC voltage was applied to the probe as well, namely in such a manner that the influence of the AC voltage on the mechanical resonator was compensated and disappeared. For this purpose, the spectral components at frequency $f_{mod}$ of the control signals within the primary control loop of these microscopes were regulated to zero. In contrast to this, such a compensation is not foreseen in the present invention, nor would it in general be possible, because the present invention is aimed at measuring piezoelectric effects not electrostatic interactions. Also, there are no secondary control loops to regulate spectral components at frequency $f_{mod}$ of the control signals K and f of the primary control loop to zero. Rather, these spectral components are used for measuring the piezoelectric response.

In addition, in WO 2008/071013 there is no continuous contact between probe and sample since that prior art is used to investigate electro-static interactions and therefore strong contributions of van der Waals interactions between probe and sample are not desired. In contrast to this, in the context of the present invention, a strong mechanical interaction between probe and sample is desirable, and therefore an operation in contact mode is advantageous.

While there are shown and described presently preferred embodiments of the invention, it is to be distinctly understood that the invention is not limited thereto but may be otherwise variously embodied and practiced within the scope of the following claims.

The invention claimed is:

1. A method for measuring a piezoelectric response of a sample by means of a scanning probe microscope, wherein said scanning probe microscope comprises a probe on a mechanical resonator, and an actuator for applying a mechanical force to said mechanical resonator,
said method comprising the steps of:
applying an AC-voltage $U_{AC}$ in order to generate an alternating electric field in said sample and thereby to generate the piezoelectric response of said sample, which piezoelectric response exerts a first oscillating force to said resonator through said probe;
applying, by means of said actuator, a second oscillating force, in addition to said first oscillating force, to said resonator, wherein said second oscillating force has a frequency corresponding to a resonance frequency f of said resonator, thereby causing said resonator to perform a resonant oscillation; and
deriving said piezoelectric response from an influence of said applied AC-voltage on said resonant oscillation,
wherein said AC-voltage has a frequency equal to said resonance frequency f and a constant phase shift $\phi$ in respect to a motion of said resonator.

2. The method of claim 1, wherein said scanning probe microscope is operated in contact mode with said probe in continuous mechanical contact with said sample.

3. The method of claim 1, wherein said AC-voltage $U_{AC}$ is applied between said probe and said sample.

4. The method of claim 1, wherein a constant DC-voltage $U_{DC}$ is added to said AC-voltage $U_{AC}$.

5. The method of claim 1, wherein said probe is oscillating at said resonance frequency in a direction having a non-zero component parallel to a surface of said sample for measuring a piezoelectric response causing a deformation of said sample parallel to said surface and/or
wherein said probe is oscillating at said resonance frequency in a direction having a non-zero component perpendicular to a surface of said sample for measuring a piezoelectric response causing a deformation of said sample perpendicularly to said surface.

* * * * *

UNITED STATES PATENT AND TRADEMARK OFFICE
CERTIFICATE OF CORRECTION

PATENT NO. : 8,950,010 B2
APPLICATION NO. : 13/060858
DATED : February 3, 2015
INVENTOR(S) : Rychen It is certified that error appears in the above-identified patent and that said Letters Patent is hereby corrected as shown below:

On the title page item [57],

Lines 2-3, "probe (2) is in contact with the sample (3)." should read -- probe is in contact with the sample. --.

Line 3, "sample (3)" should read -- sample --.

Line 4, "(1) and an actuator (5)" should read -- and an actuator --.

Lines 4-5, "loop (7, 11, 12, 4)" should read -- loop --.

Lines 9-10, "sample (3). A lock-in detector (20)" should read -- sample. A lock-in detector --.

Lines 14-15, "operation of the detector oscillator resonator (1)" should read -- operation of the resonator --.

Signed and Sealed this
Seventeenth Day of May, 2016

Michelle K. Lee
*Director of the United States Patent and Trademark Office*